United States Patent Office 3,786,098
Patented Jan. 15, 1974

3,786,098
PRODUCTION OF POLYALKYL PHENOLS AND POLYALKYL NAPHTHOLS BY OXIDATION OF POLYALKYL BENZENES AND POLYALKYL NAPHTHALENES WITH HF-H₂O₂
Louis Schmerling, Riverside, and Jerome A. Vesley, Park Ridge, Ill., assignors to Universal Oil Products Company, Des Plaines, Ill.
No Drawing. Continuation-in-part of application Ser. No. 797,694, Feb. 7, 1969. This application May 15, 1972, Ser. No. 253,367
Int. Cl. C07c 37/00
U.S. Cl. 260—586 B                                8 Claims

ABSTRACT OF THE DISCLOSURE

Concurrent isomerization of, and nuclear addition of an oxygen-containing substituent to, an alkylaromatic compound containing a minimum of 3 alkyl substituents is accomplished by treating the compound with hydrogen peroxide in the presence of hydrogen fluoride at a temperature in the range of from about −10° to about 100° C.

CROSS-REFERENCE TO RELATED APPLICATIONS

This application is a continuation-in-part of our copending application Ser. No. 797,694, filed Feb. 7, 1969, now abandoned.

This invention relates to a process for the treatment of alkylaromatic compounds. More particularly the invention is concerned with a process whereby an oxygen-containing substituent is introduced on the aromatic nucleus of an alkylaromatic compound containing at least 3 alkyl substituents.

The alkylaromatic compounds possessing oxygen-containing substituents on the nucleus of the compound which are prepared according to the process of this invention will find a wide variety of uses in the chemical field. Alkylphenols and alkylnaphthols such as mesitol (2,4,6-trimethylphenol) may be used as intermediates in the preparation of pharmaceuticals, in phenolic resins, and in the preparation of other specialty chemicals. In addition, they may also be used as inhibitors for retarding the oxidative deterioration of organic compounds such as petroleum products including fuel oil, gasoline, etc., food such as butter, lard, vegetable oil, fish oil, sesame oil, cottonseed oil, safflower oil, rapeseed oil, etc., rubbers such as natural rubber, synthetic rubber, etc., cumene oxidation, cyclic ethers, etc., whereby unwanted gums, rancidity, or cracking, the unwanted reaction depending upon the particular substrate, occurs. Likewise, other polyalkylaromatic alcohols may be used as flotation agents, surfactants, scouring powders, lube oil additives, photographic developers, etc.

Heretofore the prior art has shown that certain compounds may be subjected to nuclear hydroxylation. For example, one prior art reference discloses the hydroxylation of tertiary alkylbenzenes and naphthalenes in which the chief products produced by the reaction comprise phenolic compounds which do not contain any alkyl group, the tertiary alkyl group having been displaced by a hydroxy group. Other references also disclose the hydroxylation of aromatic compounds which contain one or two substituents. Yet another reference which appear in the prior art discloses the use of a Lewis acid as a catalyst, a specific example of the Lewis acid type catalysts being aluminum chloride. In contradistinction to this, the instant application uses hydrogen fluoride which is a Bronsted acid as a catalyst, the hydrogen fluoride being vastly different than the aluminum chloride catalyst in its behavior.

It has now been discovered that a totally unexpected reaction occurred when aromatic compounds such as benzene which contains a minimum of 3 alkyl substituents or naphthalene which contains a minimum of 4 alkyl substituents and particularly alkyl substituents which are primary in nature were subjected to the action of hydrogen peroxide in the presence of a hydrogen fluoride catalyst. With 3–4 or more substituents on the aromatic nucleus, the crowded conditions of the nucleus in the intermediate state of the reaction provide such steric hindrance that a rearrangement of the alkyl substituents is effected and that unexpected products are obtained thereby. The fact that the primary alkyl substituents undergo a shift of position on the aromatic nucleus is especially unexpected inasmuch as hydrogen fluoride (unlike Lewis acids such as the Friedel-Crafts catalyst) does not normally catalyze a rearrangement or a shift of alkyl substituents on aromatic rings.

In the case of an aromatic nucleus such as benzene or naphthalene, which contains one or two substituents thereon, it is easy to predict, using generally accepted chemical principles that govern the orientation of incoming electrophilic reactants, the position that these reactants will assume on the ring. However, in contradistinction to this, as will be hereinafter shown in greater detail, in the case where the aromatic nucleus contains 3 or more substituents many of the products which are produced thereby are totally unexpected. The isomerization of the alkyl substituent on the aromatic nucleus accompanied by the introduction of an oxygen-containing substituent on the aromatic nucleus could not be predicted by any accepted chemical rules relating to aromatic substitution and the rules of steric interference which usually govern the reactions and rearrangements of the product could not be used to predict the obtention of such products.

It is therefore an object of this invention to provide a process for introducing an oxygen-containing substituent on the aromatic nucleus of an alkylaromatic compound containing at least 3 alkyl substituents, the introduction of the oxygen-containing substituent being accompanied by a concurrent isomerization or rearrangement of the aforesaid alkyl substituents.

In one aspect an embodiment of this invention resides in a process for the concurrent isomerization of, and nuclear addition of an oxygen-containing substituent to, an alkylaromatic compound having the formula:

$$R_mAr$$

in which Ar is benzene or naphthalene, R is a primary alkyl substituent of from 1 to 3 carbon atoms and $m$ is an integer of from 3 to 6 when Ar is benzene and from 4 to 8 when Ar is naphthalene, two of said alkyl substituents being in para-position and at least 2 alkyl substituents being present on each of the rings in the naphthalene compound, which comprises treating said aromatic compound with hydrogen peroxide in the presence of hydrogen fluoride maintained at a concentration greater than 60% hydrogen fluoride at a temperature in the range of from −10° to about 100° C., and recovering the resultant isomerized alkylaromatic compound possessing an oxygen containing nuclear substituent.

A specific embodiment of this invention is found in a process for the concurrent isomerization of, and nuclear addition of an oxygen-containing substituent, to an alkylaromatic compound which comprises treating hexamethylbenzene with hydrogen peroxide in the presence of hydrogen fluoride which is maintained at a concentration greater than 60%, at a temperature in the range of from −10° to about 100° C. and an ambient pressure, and recovering the resultant mixture comprising pentamethylphenol and 2,3,4,5,6,6-hexamethyl-2,4-cyclohexadienone.

Other objects and embodiments will be found in the following further detailed description of the present invention.

As hereinbefore set forth the present invention is concerned with a process for the concurrent isomerization or rearrangement of alkyl substituents and the introduction of an oxygen-containing substituent on the nucleus of an aromatic compound and particularly on the nucleus of an alkylaromatic compond containing at least 3 primary alkyl substituents, said process being effected by treating the alkylaromatic compound with hydrogen peroxide in the presence of hydrogen fluoride. The starting materials which may be utilized in the proces of this invention comprise alkylaromatic compounds possessing the generic formula:

$$R_mAr$$

in which Ar is benzene or naphthalene, R is a primary alkyl substituent of from 1 to 3 carbon atoms and $m$ is an integer of from 3 to 6 when Ar is benzene and from 4 to 8 when Ar is naphthalene, two of said alkyl substituents being in para-position. Some specific examples of these compounds will include 1,2,4-trimethylbenzene (pseudocumene),
1,2,3,4-tetramethylbenzene (prehnitole),
1,2,3,5-tetramethylbenzene (isodurene),
1,2,4,5-tetramethylbenzene (durene),
1,2,3,4,5-pentamethylbenzene,
hexamethylbenzene,
1,2,4-triethylbenzene,
1,2,3,4-tetraethylbenzene,
1,2,3,5-tetraethylbenzene,
1,2,4,5-tetraethylbenzene,
1,2,3,4,5-pentaethylbenzene,
hexaethylbenzene,
1,2,4-tri-n-propylbenzene,
1,2,3,4-tetra-n-propylbenzene,
1,2,3,5-tetra-n-propylbenzene,
1,2,4,5-tetra-n-propylbenzene,
1,2,3,4,5-penta-n-propylbenzene,
hexa-n-propylbenzene,
1,2,5,8-tetramethylnaphthalene,
1,3,5,8-tetramethylnaphthaline,
1,4,5,8-tetramethylnaphthalene,
1,2,3,5,8-pentamethylnaphthalene,
1,2,4,5,8-pentamethylnaphthalene,
1,2,4,5,6,8-hexamethylnaphthalene,
1,2,4,5,7,8-hexamethylnaphthalene,
heptamethylnaphthalenes,
octamethylnaphthalene,
1,2,5,8-tetraethylnaphthalene,
1,3,5,8-tetraethylnaphthalene,
1,4,5,8-tetraethylnaphthalene,
1,2,3,5,8-pentaethylnaphthalene,
1,2,4,5,8-pentaethylnaphthalene,
1,2,4,5,6,8-hexaethylnaphthalene,
1,2,4,5,7,8-hexaethylnaphthalene,
heptaethylnaphthalenes,
octaethylnaphthalene,
1,2,5,8-tetra-n-propylnaphthalene,
1,3,5,8-tetra-n-propylnaphthalene,
1,4,5,8-tetra-n-propylnaphthalene,
1,2,3,5,8-penta-n-propylnaphthalene,
1,2,4,5,8-penta-n-propylnaphthalene,
1,2,4,5,6,8-hexa-n-propylnaphthalene,
hepta-n-propylnaphthalenes,
octa-n-propylnaphthalene.

The process of this invention is effected by treating an alkylaromatic compound of the type hereinbefore set forth in greater detail with hydrogen peroxide in the presence of a catalyst comprising hydrogen fluoride. The hydrogen peroxide may be present in an aqueous solution containing from 5% up to about 90% or more hydrogen peroxide. In the preferred embodiment of the invention, the hydrogen peroxide solution will contain from 30% to 50% or higher concentrations of hydrogen peroxide inasmuch as, when utilizing a lesser amount, the aqueous portion of the solution will tend to dilute the hydrogen fluoride catalyst which is preferably charged to the reaction zone in anhydrous form. When the concentration of the hydrogen fluoride catalyst falls below a figure of about 60% to 70% hydrogen fluoride, the reaction will slow down and eventually cease; therefore it is necessary to maintain the concentration of hydrogen fluoride in the reaction mixture in an amount greater than 60% and preferably greater than about 80%, thus necessitating the use of a relatively concentrated hydrogen peroxide solution. In addition, it is also contemplated, if so desired, that an additional compound such as boron trifluoride or a ferric fluoroborate having the formula: $FeF_2 \cdot BF_3$ may be utilized as a promoter to increase the catalytic activity and thereby permit the reaction to proceed in such a manner as to provide increased yields of the desired product. Other hydroxylation conditions will include temperatures and pressures, said reaction temperatures being in a range of from about −10° up to about 100° C. or more and preferably in a range of from about 0° to about 40° C. The reaction pressure which is utilized will preferably comprise ambient pressure, although somewhat higher pressures ranging from 2 to about 50 atmospheres may be used, the reaction pressure being that which is necessary to maintain a substantial portion of the reactants and the catalyst in the liquid phase. The superatmospheric pressures, if such are used, may be autogenous or may be provided for by the introduction of a substantially inert gas such as nitrogen into the reaction zone. The obtention of either a monohydroxylated aromatic compound or polyhydroxylated aromatic compound can be varied according to the amount of alkylaromatic compound which is treated with the hydrogen peroxide. For example, if a mono-hydroxylated aromatic compound is desired, an excess of the starting alkylaromatic compound will be used. Conversely speaking, if the polyalkylaromatic compound is capable of being polyhydroxylated, that is, it contains less than 5 alkyl substituents in the case of benzene or less than 7 alkyl substituents in the case of naphthalene, the relative amount of hydrogen peroxide which is used will be increased. Generally speaking the alkylaromatic compound will be present in a mole ratio in the range of from about 3:1 to about 15:1 moles of alkylaromatic compound per mole of hydrogen peroxide, although greater or lesser amounts of aromatic compound may also be used.

The process of the present invention may be effected in either a batch or continuous type operation. For example, when a batch type operation is used, a quantity of the alkylaromatic compound containing at least 3 alkyl substituents which are primary in nature which is to undergo nuclear substitution by an oxygen-containing radical plus concurrent isomerization or rearrangement of at least one of the alkyl substituents is placed in an appropriate apparatus such as, for example, an alkylation flask or an autoclave of either the rotating or mixing type, along with the substantially anhydrous hydrogen fluoride. The hydrogen peroxide is slowly added thereto and the reaction is allowed to proceed for a predetermined residence time under the operation conditions of temperature and pressure which have been set forth in greater detail in the above specification. The reaction is allowed to proceed for a predetermined residence time which may range from 0.5 up to about 10 hours or more in duration. Upon completion of the desired residence time, the catalyst is purged from the reactor by utilizing a stream of inert gas such as nitrogen and the reaction product is thereafter removed or recovered from the reaction vessel. Following this, the reaction product is subjected to conventional means of separation, purification, and recovery, said means including washing the product with an inert organic solvent such as a paraffin, neutralizing any hydrogen fluoride which still may be present along with the reaction product, flashing off the aforesaid solvent and subjecting the product to fractional distillation in order to recover the desired products which may comprise hydroxylated oxygenated compounds.

It is also contemplated within the scope of this invention that the process for introducing an oxygen-containing substituent into the nucleus of an alkylaromatic compound containing at least 3 primary alkyl substituents with the concurrent rearrangement of at least one of said alkyl substituents may be effected in a continuous manner of operation. When such a type of operation is used, the alkylaromatic compound containing at least 3 alkyl substituents on the nucleus is continuously charged to a reaction zone which is maintained at the proper operating conditions of temperature and pressure within the range hereinbefore set forth. In addition, the hydrogen peroxide in the form of an aqueous solution containing from 5% up to 90% or more hydrogen peroxide, and preferably containing 30–60% hydrogen peroxide is continuously charged to the reaction zone in a metered amount. The reaction is allowed to proceed in the presence of a hydrogen fluoride catalyst, which is also present in the reaction zone, for a predetermined period of time ranging from about 0.01 up to about 2 hours or more, following which the reactor effluent is continuously withdrawn. Alternatively speaking it is also contemplated within the scope of this invention that the hydrogen peroxide solution and the substantially anhydrous hydrogen fluoride may be premixed prior to entry into said reaction zone and the resulting solution continuously charged thereto in a single stream. Following removal of the reactor effluent from the reaction zone, it is separated from the catalyst and thereafter subjected to purification and recovery means similar in nature to those hereinbefore set forth whereby the desired hydroxylated or oxygenated compounds may be recovered.

Examples of hydroxylated or oxygenated alkylaromatic compounds which may be prepared, with the concurrent isomerization or rearrangement of at least one anhydrous substituent on the ring, according to the process of this invention will include 2,4,6-trimethylphenol (mesitol),
2,3,4-trimethylphenol,
2,3,4,5-tetramethylphenol,
2,3,4,6-tetramethylphenol,
2,3,5,6-tetramethylphenol,
pentamethylphenol,
2,3,4,5,6,6-hexamethyl-2,4-cyclohexadienone,
2,4,6-triethylphenol,
2,3,4-triethylphenol,
2,3,4,5-tetraethylphenol,
2,3,4,6-tetraethylphenol,
2,3,5,6-tetraethylphenol,
pentaethylphenol,
2,3,4,5,6,6-hexaethyl-2,4-cyclohexadienone,
2,4,6-tri-n-propylphenol,
2,3,4-tri-n-propylphenol,
2,3,4,5-tetra-n-propylphenol,
2,3,4,6-tetra-n-propylphenol,
2,3,5-tetra-n-propylphenol,
penta-n-propylphenol,
2,3,4,5,6,6-hexa-n-propyl-2,4-cyclohexadienone,
2,4,5,8-tetramethyl-1-naphthol,
2,3,4,5,8-pentamethyl-1-naphthol,
1,3,4,5,8-pentamethyl-1-naphthol,
the isomeric hexamethylnaphthols,
heptamethylnaphhthols,
2,4,5,8-tetraethyl-1-naphthol,
2,3,4,5,8-pentaethyl-1-naphthol,
2,3,4,7,8-pentaethyl-1-naphthol,
the isomeric hexaethylnaphthols,
heptaethylnaphthols,
2,4,5,8-tetra-n-propyl-1-naphthol,
2,3,4,5,8-penta-n-propyl-1-naphthol,
1,3,4,5,8-penta-1-n-propyl-2-naphthol,
the isomeric hexa-n-propylnaphthols,
hepta-n-propylnaphthols.

It is to be understood that the aforementioned compounds are only representative of the class of hydroxylated and oxygenated isomerized alkylaromatic compounds which may be prepared and that the present invention is not necessarily limited thereto.

The following examples are given to illustrate the process of the present invention which, however, are not intended to limit the generally broad scope of the present invention in strict accordancet herewith.

EXAMPLE I

In this example 361 g. (3.0 mole) of 1,2,4-trimethylbenzene were placed in a stainless steel turbomixer autoclave. Following this 246 g. (12.3 mole) of hydrogen fluoride were charged thereto and the autoclave was cooled to a temperature of about 0° C. When the autoclave had reached this temperature 30 cc. (0.29 mole) of a 30% anhydrous hydrogen peroxide was gradually charged to the reactor during a period of about 60 minutes. Upon completion of the addition of the hydrogen peroxide solution the mole ratio of 1,2,4-trimethylbenzene to hydrogen peroxide was 10:1. The mixture was then stirred for an additional period of 15 minutes, the temperature during the entire 75 minutes of contact time being maintained at about 0° C. by means of an ice bath. At the end of this time the hydrogen fluoride was swept out of the autoclave with a stream of nitrogen for a period of 2 hours before the autoclave was opened.

After opening the autoclave the reaction product was transferred to a Teflon beaker and the autoclave parts were washed with benzene, the washings being added to the reaction product. The solution was decanted into another beaker, thereby separating out a small amount of an aqueous acid phase which contained some benzene-insoluble product. The decanted benzene solution was treated to remove residual hydrogen fluoride, filtered under suction and distilled to remove benzene and unreacted 1,2,4-trimethylbenzene. The benzene-insoluble product which remained in the autoclave was combined with that product in the aqueous acid phase and extracted with ether. The extract was treated to remove residual hydrogen fluoride and subjected to distillation to remove the ether. The bottoms from both product segments were combined and subjected to fractional distillation under reduced pressure. The product which was recovered comprised 2,4,5-trimethylphenol (obtained in 21 mole percent yield), 2,3,6-trimethylphenol (16 mole percent), 2,4,6-trimethylphenol (14 mole percent), and 2,3,4-trimethylphenol (7 mole percent). The latter two compounds represent products of rearrangement.

EXAMPLE II

In this example the charge comprised 16 g. (0.1 mole) of hexamethylbenzene. This charge was placed in an autoclave of the type hereinbefore set forth in Example I above, after which 420 g. of anhydrous hydrogen fluoride were charged thereto. Following this, 6 g. of a 30% aqueous hydrogen peroxide solution were charged to the autoclave during a period of about 60 minutes. The autoclave was immersed in an ice bath and maintained at a temperature of about 5° C. during the reaction time. At the end of the aforementioned reaction time, the hydrogen fluoride was purged from the autoclave by means of a stream of nitrogen for a period of about 2 hours. The autoclave was then opened and the reaction product recovered. The autoclave was washed with benzene and the washings combined with the reaction product. At this time a phase separation occurred when the solution was decanted into another vessel. After neutralization and recovery of the benzene by distillation, the bottoms were combined with the bottoms from an ether extract of the aqueous layer which had also been treated in a similar manner to that set forth in Example I above. Distillation of the bottoms yielded 2,3,4,5,6,6-hexamethyl-2,4-cyclohexadienone (80 mole percent yield) and pentamethylphenol. Formation of these products is explained by the following mechanistic equations:

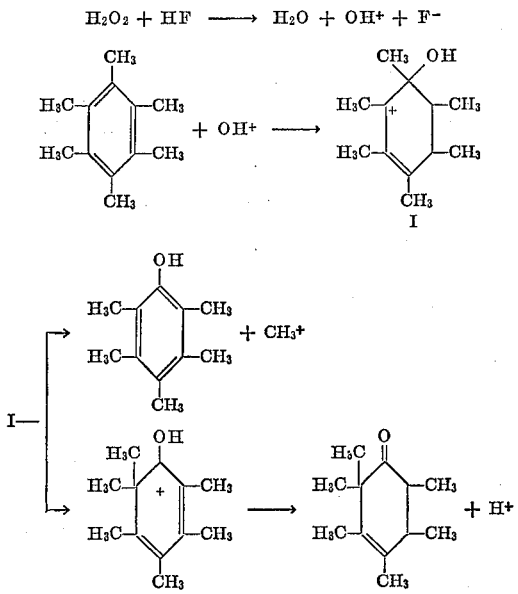

EXAMPLE III

In this experiment the charge stock comprising 334 g. (2.0 mole) of 1,2,4-triethylbenzene is placed in a stainless steel turbomixer autoclave which contains 218 g. (10.9 mole) of anhydrous hydrogen fluoride. The autoclave is cooled to a temperature of approximately 0° C. and 43.7 g. of a 30% aqueous hydrogen peroxide solution is slowly added to the autoclave during a period of 60 minutes. During the addition of the hydrogen peroxide and for a period of 10 minutes, the temperature of the autoclave is maintained in a range of from about 0° to about 5° C. by means of an ice bath. The mixture, after completion of the addition of the hydrogen peroxide, is stirred while maintaining the temperature in the aforementioned range. At the end of about an hour, the hydrogen fluoride is swept out of the autoclave utilizing a stream of nitrogen as the purging agent, said purge being accomplished during a period of 2 hours.

The autoclave is opened, the reaction product is recovered and transferred to a Teflon beaker. The autoclave is then washed with benzene and the washings are combined with the reaction product. A phase separation will occur at this point when the solution is decanted into another vessel. After neutralization to remove any residual hydrogen fluoride, the solution is filtered and distilled to remove benzene in unreacted 1,2,4-triethylbenzene. The benzene-insoluble product which remains in the autoclave is combined with the product in the aqueous acid phase and extracted with ether. This extract is then filtered to remove residual hydrogen fluoride and is subjected to distillation to remove the ether. The bottoms from both product segments are combined and subjected to fractional distillation under reduced pressure to recover the product which comprises a mixture of 2,4,6-triethylphenol and 2,3,4-triethylphenol.

EXAMPLE IV

In a similar manner 354 g. (2.0 mole) of 1,2,4,5,8-pentamethylnaphthalene is treated with 208 g. of anhydrous hydrogen fluoride and 43.7 g. of a 30% aqueous hydrogen peroxide solution following the procedures set forth in the above examples. After flushing the autoclave for 2 hours with nitrogen to remove the hydrogen fluoride, the autoclave is opened and the reaction product is transferred to a beaker. The autoclave is washed with benzene and the washings are combined with the reaction product in the beaker. Following this, the solution is decanted to separate out the aqueous acid phase which will contain some benzene-insoluble product. The decanted benzene solution is neutralized to remove hydrogen fluoride, filtered, and thereafter distilled to remove benzene and unreacted pentamethylnaphthalene. The benzene-insoluble product is combined with the product of the aqueous acid phase and the combination is extracted with ether. This extraction is then neutralized to remove residual hydrogen fluoride and distilled to remove the ether. The bottoms from both segments are combined and subjected to fractional distillation under reduced pressure, the product including the product of hydroxylation accompanied by rearrangement, namely 2,3,4,5,8-pentamethyl-1-naphthol.

EXAMPLE V

A charge stock comprising 268 g. (2.0 mole) of 1,2,4,5-tetramethylbenzene (durene) is placed in a stainless steel turbomixer autoclave. Following this 218 g. (10.9 mole) of hydrogen fluoride is charged thereto and thereafter 43.7 grams of a 30% aqueous hydrogen peroxide solution is slowly added to the reactor during a period of 60 minutes, the temperature of the reactor being maintained in a range of from about 0° to about 10° C. The mixture, after completion of the addition of the hydrogen peroxide, is stirred for an additional period of 15 minutes while maintaining the aforementioned temperature range. At the end of this time, the hydrogen fluoride is swept out of the autocave for a period of about 2 hours utilizing a stream of nitrogen as the purging agent.

The autoclave is then opened and the reaction product is transferred to a beaker. The autoclave is washed with benzene and the washings are then combined with the reaction product. The solution is decanted into another beaker, whereupon a small amount of an aqueous acidic phase which contains some benzene-insoluble product is separated out. The decanted benzene solution is treated to remove residual hydrogen fluoride by neutralization, filtered under suction and thereafter distilled to remove residual hydrogen fluoride by neutralization, filtered under suction and thereafter distilled to remove benzene and unreacted tetramethylbenzene. The benzene-insoluble product is combined with the product of the aqueous acid phase and the combination is extracted with ether. The extract is then treated to remove residual hydrogen fluoride and subjected to distillation to remove the ether. The bottoms from both of the segments are combined and subjected to fractional distillation under reduced pressure, the desired product comprising 2,3,4,6-tetramethylphenol being recovered therefrom.

We claim as our invention:

1. A process for the concurrent isomerization of, and nuclear addition of an oxygen-containing substituent to, and alkylaromatic compound having the formula:

$$R_mAr$$

in which Ar is benzene or naphthalene, R is a primary alkyl substituent of from 1 to 3 carbon atoms and $m$ is an integer of from 3 to 6 when Ar is benzene and from 4 to 8 when Ar is naphthalene, two of said alkyl substituents being in para-position and at least two alkyl substituents being present on each of the rings in the naphthalene compound, which comprises treating said alkylaromatic compound with hydrogen peroxide in the presence of hydrogen fluoride maintained at a concentration greater than 60% hydrogen fluoride at a temperature in the range of from $-10°$ to about 100° C., and recovering the resultant isomerized alkylaromatic compound possessing an oxygen-containing nuclear substituent.

2. The process as set forth in claim 1 in which said process is effected at a temperature in the range of from about 0° to about 40° C. and at ambient pressures.

3. The process as set forth in claim 1 in which said hydrogen peroxide comprises an aqueous solution containing from about 5% to about 90% hydrogen peroxide.

4. The process as set forth in claim 1 in which said alkylaromatic compound is hexamethylbenzene and the product is a mixture comprising pentamethylphenol and 2,3,4,5,6,6-hexamethyl-2,4-cyclohexadienone.

5. The process as set forth in claim 1 in which said alkylaromatic compound is 1,2,4-trimethylbenzene and the product is a mixture comprising 2,4,6-trimethylphenol and 2,3,4-trimethylphenol.

6. The process as set forth in claim 1 in which said alkylaromatic compound is 1,2,4-triethylbenzene and the product is a mixture comprising 2,4,6-triethylphenol and 2,3,4-triethylphenol.

7. The process as set forth in claim 1 in which said alkylaromatic compound is 1,2,4,5,8-pentamethylnaphthalene and the product comprises 2,3,4,5,8-pentamethylnaphthol.

8. The process as set forth in claim 1 in which said alkylaromatic compound is 1,2,4,5-tetramethylbenzene and the product comprises 2,3,4,6-tetramethylphenol.

References Cited
UNITED STATES PATENTS

| | | | |
|---|---|---|---|
| 3,377,386 | 4/1968 | Chafetz | 260—621 G |
| 3,407,237 | 10/1968 | Vesley | 260—621 G |
| 3,461,170 | 8/1969 | Schmerling | 260—621 GX |

LEON ZITVER, Primary Examiner

N. MORGENSTERN, Assistant Examiner

U.S. Cl. X.R.

260—621, 624 R

UNITED STATES PATENT OFFICE
CERTIFICATE OF CORRECTION

Patent No. 3,786,098  Dated January 15, 1974

Inventor(s) LOUIS SCHMERLING, ET AL

It is certified that error appears in the above-identified patent and that said Letters Patent are hereby corrected as shown below:
Column 7, lines 7-30, change the equations to read:

$H_2O_2 + HF \longrightarrow H_2O + OH^+ + F^-$

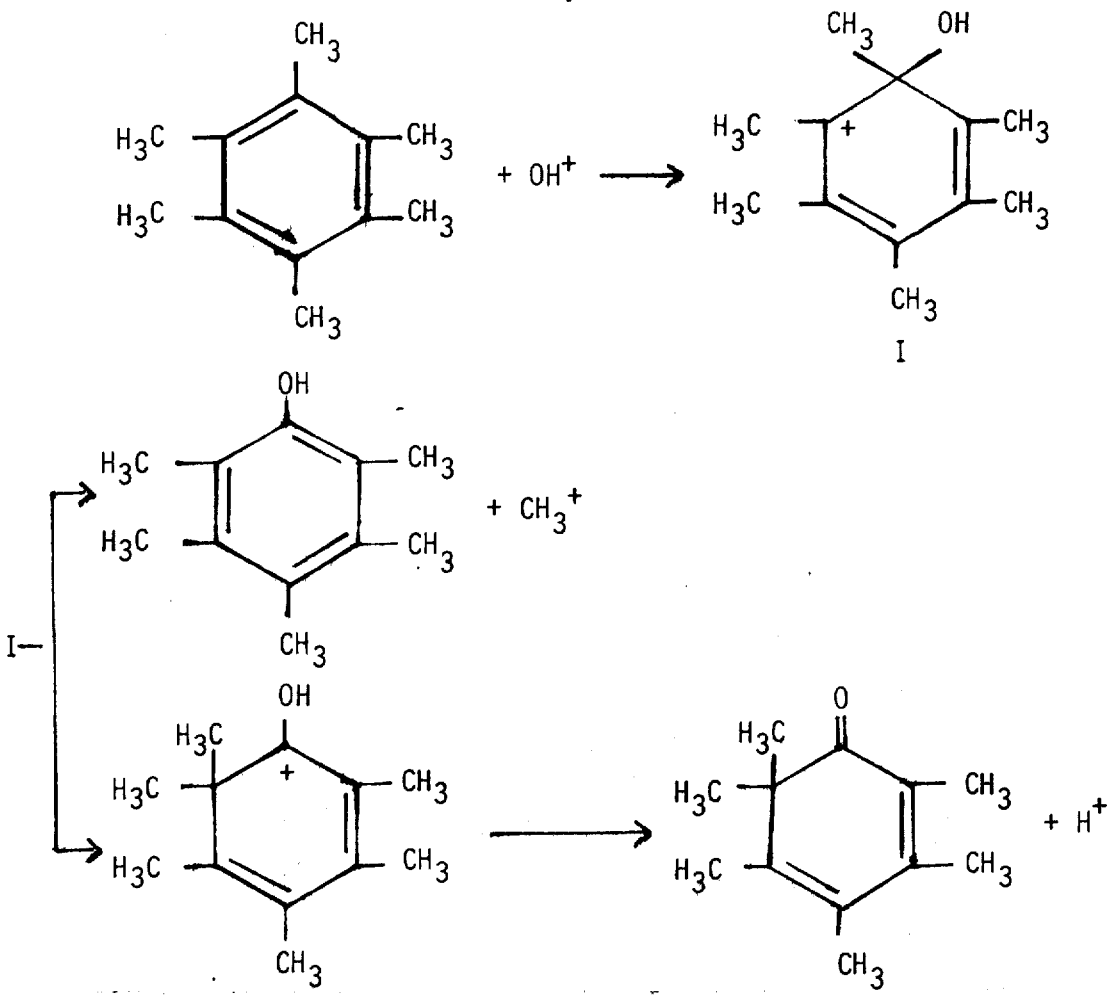

Signed and sealed this 16th day of July 1974.

(SEAL)
Attest:

McCOY M. GIBSON, JR.
Attesting Officer

C. MARSHALL DANN
Commissioner of Patents